United States Patent [19]

Parsons et al.

[11] Patent Number: 5,062,320
[45] Date of Patent: Nov. 5, 1991

[54] DIFFERENTIAL MECHANISM

[75] Inventors: David Parsons, Kenilworth; Wilfred N. Bainbridge, Banbury; Alastair J. Young, Kenilworth; Harry D. Temperley, Leamington Spa, all of England

[73] Assignee: 501 Automotive Products Plc, England

[21] Appl. No.: 543,747

[22] PCT Filed: Jan. 19, 1989

[86] PCT No.: PCT/GB89/00053
§ 371 Date: Jul. 11, 1990
§ 102(e) Date: Jul. 11, 1990

[87] PCT Pub. No.: WO89/06761
PCT Pub. Date: Jul. 27, 1989

[30] Foreign Application Priority Data

Jan. 22, 1988 [GB] United Kingdom ............... 8801401
Feb. 25, 1988 [GB] United Kingdom ............... 8804373

[51] Int. Cl.$^5$ ............................................. F16H 35/04
[52] U.S. Cl. ..................... 74/650; 74/665 B; 74/665 C; 74/665 D
[58] Field of Search ............... 74/650, 665 B, 665 C, 74/665 D

[56] References Cited

U.S. PATENT DOCUMENTS

| | | | |
|---|---|---|---|
| 1,283,283 | 10/1918 | Patch | 74/650 |
| 2,220,432 | 11/1940 | Wales | 74/650 |
| 2,850,919 | 9/1958 | Wildhaber | 74/650 |
| 3,130,604 | 4/1964 | Johnson et al. | 74/650 |

FOREIGN PATENT DOCUMENTS

741812 10/1944 Fed. Rep. of Germany .
431020 6/1935 United Kingdom .

Primary Examiner—Leslie A. Braun
Assistant Examiner—William O. Trousdell
Attorney, Agent, or Firm—Shlesinger Arkwright Garvey

[57] ABSTRACT

The differential comprises a drive input element, two output cam members each rotatable about a common axis, each cam member having a single angular cam surface thereon of undulating form arranged such that the cam surfaces on the cam members converge towards each other and a plurality of cam followers. The followers have cam engaging end surfaces for imparting drive from the input element to the output cam members. Relative contro-rotation of the output cam members causes the cam followers to slide axially. The cam followers are elongate in direction of the common axis and are slidably supported throughout virtually their entire length by the drive input element. The followers may be arranged closely adjacent each other to provide a degree of mutual support.

25 Claims, 7 Drawing Sheets

DIFFERENTIAL MECHANISM

The invention relates to a differential mechanism particularly but not exclusively for use in motor vehicles.

Differential mechanism commonly used on vehicles are of the sun and planet gear type and have a well known disadvantage that when one wheel is on a slippery surface such as mud or ice and the other wheel is on a firm surface capable of providing traction, the first wheel will simply spin as it receives all the available power transmitted to the differential.

Limited slip differential mechanism have been proposed in an attempt to overcome this problem which restrict the extent to which one wheel can spin relative to the other but such differential are more complex and, therefore, more costly to produce.

It has also been proposed to provide a lockable differential which enables the differential effect to be prevented completely when necessary thereby ensuring that the speed of each wheel is the same enabling the maximum available traction to be obtained at each wheel. However if the user of the vehicle overlooks the fact that the differential has been locked and drives the vehicle in normal conditions for any length of time, abnormal wear of tires and excessive transmission stresses will result.

Alternative forms of differential mechanisms have been proposed over the years, mostly in very old patent specifications. See, for example, U.S. Pat. No. 1,568,358, 2,034,318, 2,220,432, GB-A-431 020, GB-A-117 703 AND DE-C-741 812.

In the aforesaid patents the differentials each comprise an input, two outputs which include respective cam members rotatable about an axis, a plurality of cam followers having surfaces which engage the cam surfaces to impart drive to the outputs, the cam followers being drivable from the input and the arrangement being such that relative contra-rotation of said outputs causes the cam followers to slide axially.

Such arrangements are normally non-reversible so that rotation of one output cannot be transmitted through the cam followers so as to impart drive to the other output. In that manner drive will always be transmitted to one of the outputs from the input even if the other output is connected to a wheel which is spinning on a slippery surface.

To a very large extent the construction of the alternative differentials proposed in the foregoing patents is not particularly compact. For example in U.S. Pat. Nos. 2,034,318 and 2,220,432 the cam followers are made axially very wide to facilitate the cutting of grooves which provide the cam surfaces. In GB-A-117,703 and DE-C-741,812 each cam member has to provide a plurality of concentric cam surfaces associated with respective sets of followers. Further earlier proposals of the latter type are also disclosed in DE-A-1,817,553 and FR-A-479,242.

In GB-A-431,020 there is described a differential mechanism comprising a drive input element two output cam members rotatable about an axis, each said member having a single annular cam surface thereon of zig-zag or undulating form arranged such that the cam surfaces on the cam members converge towards each other, and a plurality of cam followers which have cam engaging end surfaces for imparting drive from the input element to said output cam members, the arrangement being such that relative contra rotation of said output cam members causes the cam followers to slide axially. In that differential, the cam followers are radially elongate but members are relatively short in the axial direction of the output. There is, therefore, little in the way of support for the cam followers by the input element, especially of a kind that will inhibit tipping of the followers about a radial axis due to loading thereon during operation of the differential.

SUMMARY OF THE INVENTION

One object of one aspect of the present invention is to provide a differential which is not only compact but provides improved support for the follower members.

According to an aspect of the invention there is provided a differential mechanism comprising a drive input two outputs including cam members rotatable about an axis, each said cam member having a single annular cam surface thereon of zig-zag or undulating form arranged such that the cam surfaces on the cam members converge towards each other, and a plurality of cam followers which have cam engaging end surfaces for imparting drive from the input to said outputs the arrangement being such that relative contra rotation of said outputs causes the cam followers to slide axially, the cam followers being elongate in the direction of the axis.

By providing axially elongate followers they can be supported near their ends to provide better resistance to tipping about a radial axis thereby making the system less prone to backlash.

Also, the use of single annular cam surfaces is particularly advantageous, e.g., over U.S. Pat. Nos. 2,034,318 and 2,220,432 where the cam surfaces are defined by grooves which are less straightforward to manufacture. The single cam surfaces are also advantageous from a manufacturing point of view than the concentric cam surface embodiments described in GB-A-117,703, DE-A-1,817,553 and FR-A-479,242.

Each cam follower may be of elongate strut-like form having end surfaces which engage the cam surfaces, said end surfaces terminating at relatively longer side surfaces. Such followers are advantageous over those described in U.S. Pat. Nos. 2,034,318 and 2,220,432 where the cam engaging end surfaces are formed on spaced apart teeth projecting from beneath a connecting bar. In the latter case, compressive forces on the teeth axially of the bar will create cyclic bending stresses in the bar which are undesirable.

Preferably said cam followers lie side by side with the side surfaces of the cam followers or the cam followers of said number lying closely adjacent or in interengagement.

The positioning of the cam followers in this way enables a large number of cam followers to occupy the available space and the closely adjacent cam followers may provide a degree of support for each other, in use, through the adjacent side surfaces. The use of a large number of cam followers enables driving load transmitted from the input to be applied over a substantial area of the cam. That is advantageous over GB-A-431,020 where the followers are spaced well apart and in FR-A-479,242 and further specifications such as in GB-A-694,396 and GB-A-636,163 where balls are used as followers which provide only a small area of cam surface contact.

A more recent development is described in the January 1988 edition of Eureka published by Innopress Limited where the form of the cam followers helps to spread the driving load over a substantial area of the cam. However the relatively short side surfaces at which the cam engaging end surfaces terminate provide very little in the way of mutual support for the followers and form small rubbing areas prone to wear. In the present invention this may be overcome by arranging for substantial portions of said side surfaces of the adjacent cam followers to overlap each other continuously during full axial sliding movement thereof and during contra rotation of the contents.

According to a second aspect of the invention there is provided a differential mechanism comprising an input, two outputs rotatable about an axis, two cam members one of which is connected to one said output and the other of which is connected to the other output, said cam members having annular cam surfaces of undulating form coaxial with said outputs, a plurality of cam followers having cam engaging surfaces for imparting drive to the outputs and side surfaces extending between the cam engaging surfaces, said or a number of said cam followers being arranged side by side with the side surfaces of adjacent cam followers lying closely adjacent, the arrangement being such that relative contra rotation of said outputs causes the cam followers to slide axially with substantial portions of said closely adjacent surfaces of the or said number of the adjacent cam followers overlapping continuously during the full axial sliding movement thereof.

By arranging for overlap in that way, each follower is able to provide support for the other during drive over the substantial portions of said closely adjacent surfaces.

Preferably said adjacent surfaces interengage in use and drive from the input is transmitted from a cam follower in non-driving engagement with the cam surface to a cam follower in driving engagement with the cam surface. In that way full use is made even of these cam followers which are not in driving engagement with the cam surfaces.

Means may be provided for imparting drive from the input, element, which may include an input to the cam followers and such means may be non-interposed between the side surfaces of the cam followers or the cam followers of said member.

According to a third aspect of the invention there is provided a differential mechanism comprising an input, two cam members rotatable about an axis, one of which is connected to one of the outputs and the other of which is connected to the other output, said cam members including annular cam surfaces of undulating form coaxial with said outputs, a plurality of cam followers of elongate strut-like form, said cam followers having end surfaces which engage the cam surfaces to impart drive from the input to the outputs, said end surfaces terminating at relatively longer side surfaces, the cam followers lying side by side with side surfaces of the cam followers or the cam followers of said number lying closely adjacent or in inter-engagement and means for imparting drive to the cam followers from the input positioned so as to be non-interposed between the side surfaces of the cam followers, the arrangement being such that relative contra-rotation of said outputs causes the cam followers to slide axially.

In this other aspect the arrangement of the drive means so as to be non-interposed in that way enables the maximum number of cam followers to be located in the available circumferential space.

Preferably each cam follower has an arcuate embrace of 360/nf degrees or less to leave a clearance between where nf is the number of cam followers.

Resilient means may be provided for urging the cam surfaces and the cam engaging surfaces of the cam followers against each other. The resilient means may tend to urge the cam followers radially outwardly relative to the cam surfaces.

According to a fourth aspect of the invention there is provided a differential mechanism comprising an input, two outputs rotatable about an axis, two cam members one of which is connected to one said output and the other of which is connected to the other output, each said cam having an annular cam surface thereon of undulating form coaxial with the outputs and arranged such that cam surfaces on the cam members converge towards each other, and resilient means for urging the cam surfaces and the cam engaging surfaces against each other so as to urge the cam followers radially outwardly relative to the converging cam surfaces, the arrangement being such that relative contra rotation of said outputs causes the cam followers to slide axially.

The resilient means is advantageous as it can be arranged to pre-load the differential to ensure firm interengagement of the cam surfaces and cam follower members and to reduce backlash.

Preferably the resilient means acts between part of said input and one of said cam members so as to urge said one cam member towards the other. The resilient means may apply load to the cam member through a thrust bearing. Conveniently, the resilient means may take the form of a Belleville Washer.

In order to support the cam followers, particularly during assembly of the differential, support means may be provided for biasing the cam followers towards a drive input element through which drive is transmitted to the cam followers from the input.

According to a fifth aspect of the invention there is provided a differential mechanism comprising an input two outputs rotatable about an axis, two cam members one of which is connected to one said output and the other of which is connected to the other output, said cam members having annular cam surfaces of undulating form coaxial with said outputs, a plurality of cam followers having cam engaging surfaces for imparting drive to the outputs and a drive input element for imparting drive from the input to the cam followers, and support means for biasing the cam followers towards a drive input element, the arrangement being such that relative contra-rotation of said outputs causes the cam followers to slide axially.

The support means ideally takes the form of a spring which may be generally cylindrical in shape and, e.g., coaxial with the outputs. The support means preferably serves to hold the cam follower members in the drive input element during assembly of the differential.

Where a drive input element is provided it may comprise first and second sections which are drivably interconnected so as to define openings in which the cam followers are slidably located.

According to a sixth aspect of the invention there is provided a differential mechanism comprising an input, two outputs rotatable about an axis, two cam members one of which is connected to one said output and the other of which is connected to the other output, said cam members having annular cam surfaces of undulating form coaxial with said outputs, a plurality of cam followers having cam engaging surfaces for imparting drive to the outputs, and a drive input element for imparting drive from the input to the cam followers, said drive input element comprising first and second sections which are driving interconnected so as to define openings in which the cam followers are located, the arrangement being such that relative contra-rotation of said outputs causes the cam followers to slide axially.

Such a drive input element is easier to produce than that shown in the Eureka article where the drive input element comprises a single member formed with axial through-slots for receiving the cam followers. As the cam followers described therein comprise elongate bodies formed with cam-engaging end surfaces, the bodies need to be made in two halves which are inserted into the slots from opposite ends. The use of a two section drive input element enables similar followers to be made in one piece and to be located in the openings during assembly of the drive input element.

The first section of the drive input element may include a plurality of radial projections with the cam followers disposed therebetween. The second section may comprise a sleeve coaxial with the first section, the radial projections drivably engaging the sleeve.

The radial projections may locate in grooves in the sleeves.

In one embodiment, the cam surface of one of the cam members converges towards the cam surface of the other and the cam engaging surfaces of the cam followers are complementary thereto, each cam surface having a number of mutually inclined faces which is different from the number of mutually inclined faces of the other cam surface, the angles of convergence of the cam surfaces being different whereby the torque delivered to the outputs will be divided between the outputs at a desired ratio or ratios for both directions of relative rotation between the outputs.

According to a seventh aspect of the invention there is provided a differential mechanism comprising an input, two outputs rotatable about an axis, two cam members one of which is connected to one said output and the other of which is connected to one said output and the other of which is connected to the other output, said cam members having annular cam surfaces of undulating form coaxial with said outputs, a plurality of cam followers having cam engaging surfaces for imparting drive to the outputs, the cam surface of one of the cam members converging towards the cam surface of the other and the cam engaging surfaces of the cam followers being complementary thereto, each cam surface having a number of mutually inclined faces of the other cam surface, and the angles of convergence of the cam surface being different whereby the torque delivered to the outputs will be divided between the outputs at a desired ratio or ratios for both directions of relative rotation between the outputs.

This feature is particularly useful as it enables the ratio to be selected by selecting appropriate angles of convergence. In that way the ratio can be substantially constant for both directions of relative rotation or may be different from in one direction that in the other.

The cam surface on each cam member may comprise at least two identical tracks which form the complete annular cam surface whereby axial loading applied thereto by the cam followers during drive is applied symmetrically to the cam surface to create a balanced axial loading on the cam member.

According to an eighth aspect of the invention there is provided a differential mechanism comprising an input, two outputs rotatable about an axis, two cam members one of which is connected to one said output and the other of which is connected to the other output, said cam members having annular cam surfaces of undulating form coaxial with said outputs, a plurality of cam followers having cam engaging surfaces for imparting drive to the outputs, the cam surface on each member comprising at least two identical tracks which form the complete annular cam surface whereby axial loading applied thereto by the cam followers during drive is applied substantially symmetrically to the cam surface to create a balanced axial loading on the cam member, the arrangement being such that relative contra rotation of said outputs causes the cam followers to slide axially.

Non-symmetrical loading of the cams will exert extra loading on bearings for the cam members and the differential mechanism as set out in the two immediately preceding paragraphs helps to avoid that.

Each track of one of the cams may have n pairs of cam surfaces with each track of the other cam surface having a greater number of pairs of cam surfaces. For example where each track of one cam has n pairs of cam surfaces, each track of the other cam surface may have n+1 pairs of cam surfaces. Preferably the total number of pairs of cam surfaces on each cam will be an even number.

The cam followers may be arranged as a continuous series forming an annulus of components coaxial with the cams.

Where a drive input element is provided, it may extend circumferentially around the cam followers, e.g., in the form of a sleeve.

The drive input element and cam follower members may interengage through projection and socket means. The projections and sockets may be tapered in the radial direction. The sockets may take the form of grooves which extend axially and the projections may comprise drive dogs which locate in the grooves and which are preferably elongate.

Where the cam surfaces on the cam members converge towards each other, the cam-engaging surfaces of the follower members may be complementary thereto whereby during drive of said output members through the follower members, a force is created which urges the follower members radially outwards towards the drive input element.

The force which urges a said follower radially preferably combines with a reaction force at the undulating cam surface to give a resultant outward force which inhibits tipping of the cam follower e.g., by urging a corner section of the cam follower against a substantially complementary corner section of the drive input element.

The undulating surface of each cam comprises a multiplicity of mutually inclined helical faces e.g., of zig-zag form.

In one embodiment the zig-zag faces comprises a plurality of mutually inclined pairs of faces one face 24 of each pair being inclined differentially from the other face of each pair.

The number of faces on one cam may be different from the number of faces on the other cam.

Preferably the cam engaging surfaces of the cam followers comprise two inclined helical surfaces at each end for engagement with the respective cam surfaces.

Each cam follower may include a radially inner first portion, and a radially outer second portion to which driving load is imparted, said end surfaces extending over both said first and second portions. That arrangement increases even further the areas of contact between the followers and cams giving improved wear characteristics. The radially outer second portion is preferably tapered and slidably locates within a tapered axial groove in the input element. The radially inner first section may be tapered so that first portions of the adjacent followers interengage or lie closely adjacent.

Drive from said input may be transmitted to a drive input element for imparting drive to the cam followers by removable bolts extending between spaced apart sections of the input. Alternatively the drive input element may comprise a sleeve formed with screw threading by which it is screwed to a section of the input. In the latter case, the sleeve may also be drivably secured e.g., by welding or bolting to another section of the input spaced from the first said section of the input. Such an arrangement produces a strong and easily built input assembly.

BRIEF DESCRIPTION OF THE DRAWINGS

Differential mechanisms in accordance with the invention will now be described by way of example with reference to the accompanying drawings in which.

DESCRIPTION OF THE PREFERRED EMBODIMENTS

In FIGS. 1 to 6 the differential comprises a drive input 10 in the form of a crown bevel gear 12 which receives drive from a pinion (not shown) in known manner. The gear 12 is drivably connected to drive input members 13, 14 which are interconnected by circumferentially spaced bolts 15.

Figure 1:
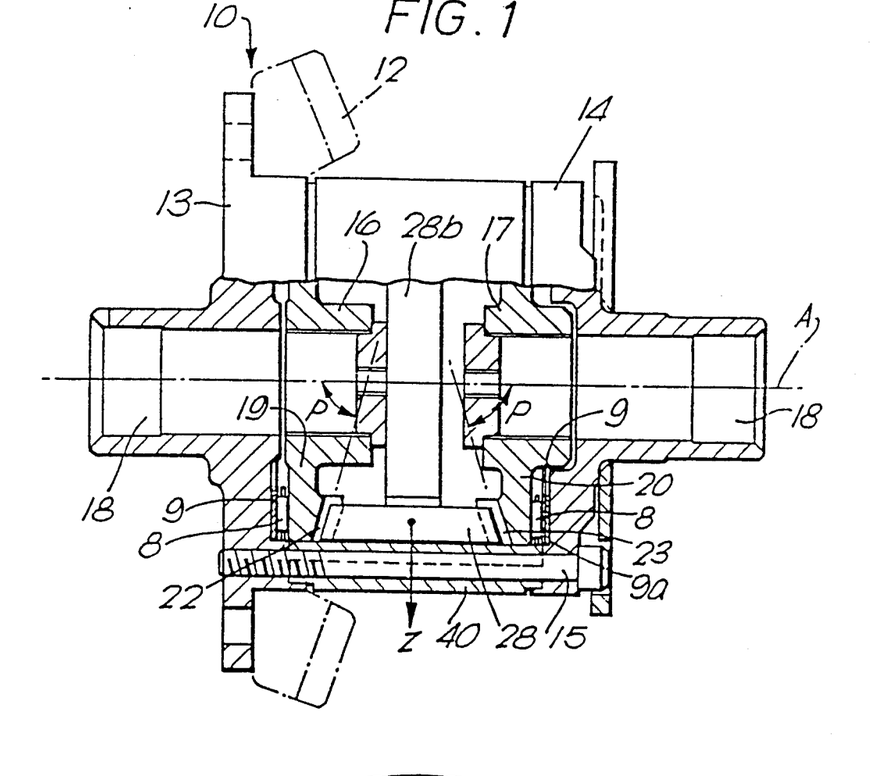
FIG. 1 is a cross-section through a differential mechanism in accordance with the invention taken through outputs cam members.

Two output cam members 16, 17 are splined, in use, to output shafts (not shown) which extend through bearings (not shown) in bores 18 in the input members 13, 14. The output members 16, 17 are rotatable about an axis A relative to the input members 13, 14. The output members 17 have respective flanges 19, 20 thereon on which are formed respective undulating face cams 22, 23. The cam 22 comprises an annular zig-zag surface shown in detail in FIG. 3 made up from seven pairs of mutually inclined helical surfaces 24, 25. The cam 23 also comprises an annular zig-zag surface apparent from FIG. 3 but is made up from eight pairs of mutually inclined helical surfaces 26, 27. As shown in FIG. 1 the undulating cam surfaces 1, 2 are inclined at identical angles P to the axis A whereby each cam surface converges towards the other.

Fifteen cam followers 28 are positioned between the cams 22, 23. Each cam follower is of strut-like elongate form and comprises two sets of mutually inclined end surfaces 29, 30, 32 and 33 which terminate at relatively longer side surfaces 34, 35. The angle of inclination Q between the end surfaces 29, 30 corresponds to the angle of inclination between the cam surfaces 24, 25 and the angle of inclination S between the end surfaces 32, 33 corresponds to the angle of the inclination between the cam surfaces 26, 27. The end surfaces 29, 30 and 32, 33 are also inclined at the angle P as apparent from FIGS. 1 and 4. When viewed from the end as in FIG. 5, it can be seen that the cam follower is arcuate which enables the followers to be assembled together as viewed in FIG. 2. Each cam follower has an arcuate embrace of substantially 360/nf degrees where nf is the number of cam followers. However, if desired, the arcuate embrace may be less to leave clearance spaces 28' (FIG. 14) between the followers.

Figure 14:
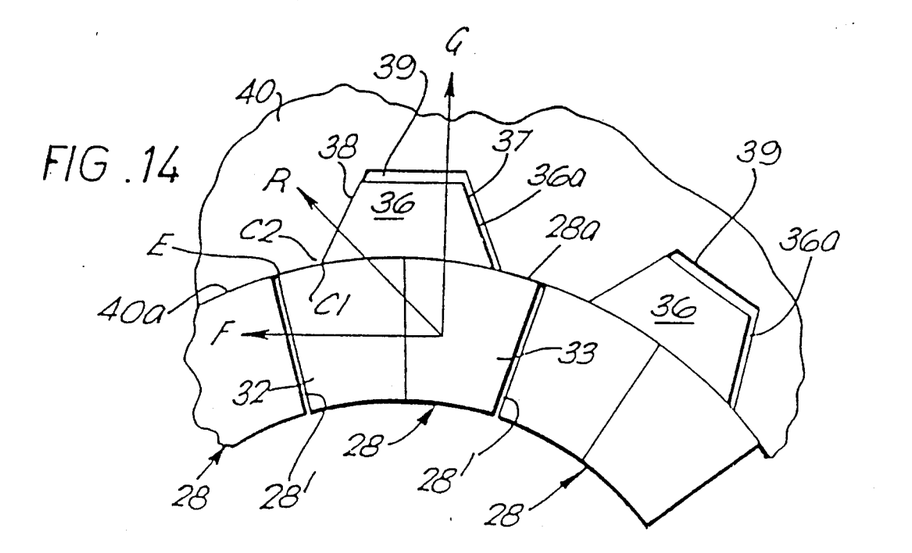
FIG. 14 is a diagrammatic end view of a follower of the kind shown in FIGS. 4 to 6 showing the way in which loading is applied thereto in use.

Each cam follower includes an elongate drive dog 36 (constituting the aforesaid projection) having mutually inclined side surfaces 37, 38 (FIG. 14). The drive dogs 36 locate with slight clearance 36a in complementary shaped grooves 39 formed in the inner periphery of a cylindrical drive input element 40 through which the bolts 15 pass so as to connect the element 40 drivably to the input members 13, 14. The clearance 36a is just sufficient to ensure that the arcuate outer periphery (indicated at 28a) of each follower 28 can abut the inner peripheral surface (40a) of the drive input element 40. The grooves 39 provide support for the followers 28 at least adjacent their axial ends and preferably, as shown, for substantially their entire length which is advantageous over GB-A-431020.

Figure 2:
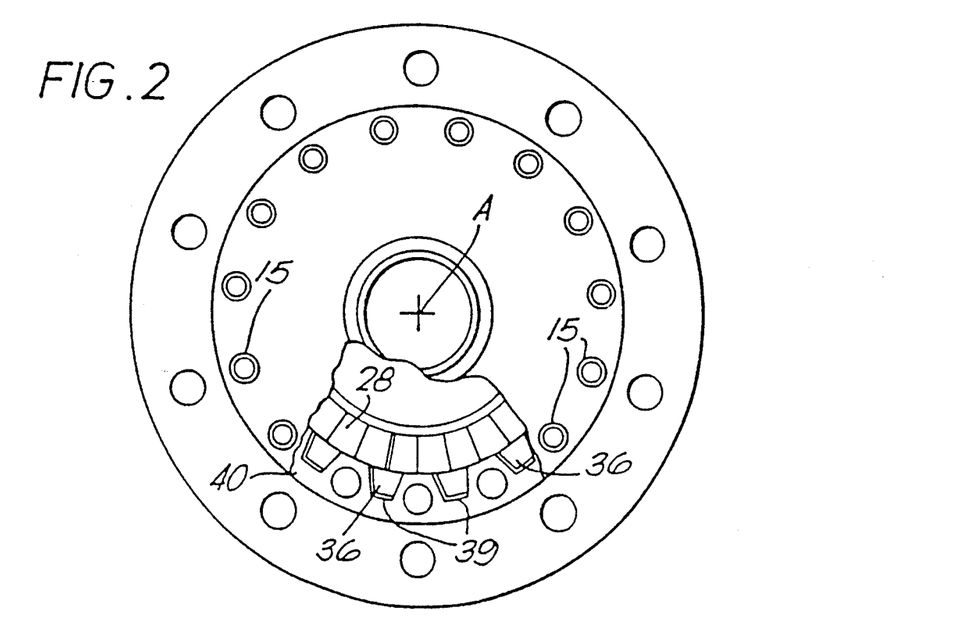
FIG. 2 is an end view of the differential of FIG. 1 shown partly broken away.
Figure 3:
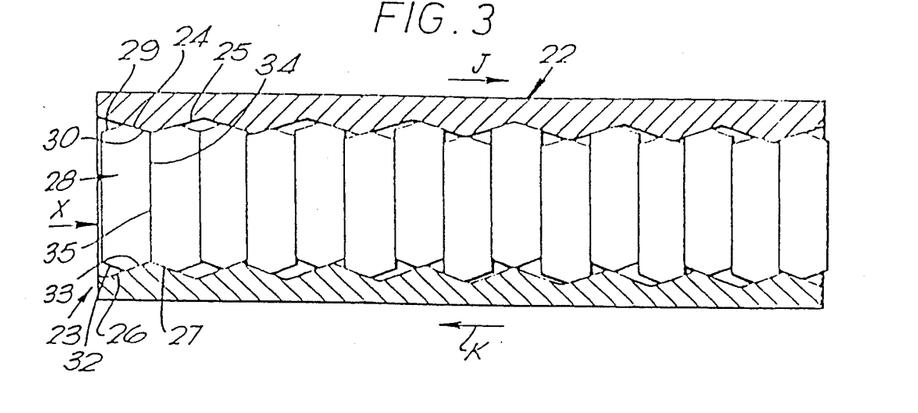
FIG. 3 is a development of cam surfaces with cam followers shown in positions therebetween.

As apparent from FIGS. 2 and 3 the assembly of the cam followers is preferably such as to place the side surfaces 34, 35 of adjacent followers so that they interengage or lie closely adjacent. In that way maximum use is made of the available circumferential space for the cam followers, the followers together forming a substantially continuous and compact annular array as viewed in FIG. 2.

To assist assembly of the cam followers 28, a light circular spring 28b may be used to bias the followers radially against the drive input element 40.

When drive input is applied through drive input element 40, and assuming that a vehicle having the differential is being driven in a straight line, the cam followers apply a load to the surfaces of cams 22, 23 so as to rotate the output members 16, 17 at equal speeds. As apparent from FIG. 3, with driving load applied in direction X the cam follower on the extreme left has its end surfaces 30, 33 in driving engagement with surfaces 24, 26 and alternate followers are similarly in driving engagement with the cams 22, 23. However intermediate cam followers have their surfaces in non-driving engagement with the cam surfaces.

The driving force applied by the followers 28 to the inclined surfaces 24, 26 produces a reaction force F as illustrated in FIG. 14. The inclination of the end surfaces of the cam follower at angle P causes the application of force F to create an outward force G thereby producing a resultant force R which passes radially outboard of edge E preferably approximately through or adjacent the line of intersection L which forms a corner C1 between the drive dog 36 and an adjacent outer peripheral part 40a of the follower 28. In that way the loading on the cam follower tends to wedge it firmly against a corner C2 of the drive input element 40 in such a way that tipping of the follower about its edge E is avoided.

The differential effect can best be appreciated considering the driving element 40 as being stationary and by applying contra rotary movement to the cams 22, 23 in directions J, K respectively in FIG. 3. The cam surface 26 will move to the left and cam surface 24 to the right. Such movement of cam surface 26 causes the associated follower to move axially towards cam 22. If both cams 22, 23 and the drive input element 40 are all given an additional rotational movement in direction of arrow J, it will be appreciated that the cams 22 and 23 will be rotating respectively faster and slower than element 40. The difference in speeds between the two cams 22, 23 and the drive input element 40 will result from the different number of cam surfaces on the cams. As there is a considerable amount of friction between the followers and the cams, torque will be transmitted to one cam even when the other is drivably connected to a wheel spinning on a slippery surface which is highly advantageous over conventional differential systems. The moving of one wheel faster than the other will result in a reduction in net torque applied to that wheel through the associated cam due to the load applied by the axially moving cam followers to which input torque is applied. There will be, in that case, an increase in the net torque applied at the other cam and the ratio between the net torques will be dependent upon the values of the angles Q, S. The greater the angles, the greater will be the friction at the cam surfaces due to axial loading applied thereto by the followers. The angles Q, S are normally selected whereby the face cams may drive the cam followers axially but mere axial movement of the cam followers cannot drive the face cams. However, if desired, the angles Q, S can be selected to provide a degree of reversibility.

As mentioned above, the adjacent cam followers may be arranged with their side surfaces 34, 35 closely adjacent or in inter-engagement. Where the side surfaces interengage, driving force F applied to any follower 28 in non-driving engagement with cam surfaces may be arranged to transmit driving load applied thereto the next driving follower through the interengaging surfaces. Also the use of interengaging surfaces further inhibits the cam followers tipping relative to the cams. Interengagement of the surface will take place over substantially their entire length which is advantageous over the differential in Eureka where only end portions interengage.

Axial thrust applied to the cams by the followers is transmitted to the input members 13, 14 through thrust needle bearings 8. Shims 9 may be used to adjust the relative axial positions of the cams. A Belleville Washer 9a (shown compressed into a flat configuration in FIG. 1) may be arranged to urge the followers 28 into firm engagement with the cams 22, 23. The urging of the followers against the cams also creates a radially outward force Z on the followers 28 resulting from the angles of inclination P and, in additional helps to reduce backlash. Shims 9, a Belleville Washer 9a and needle bearings 8 may also be used in other differential embodiments described below to urge the followers into engagement with the cams and are indicated by corresponding reference numerals in those embodiments.

Reference is now made to FIGS. 10 to 13 and parts corresponding to parts in the previous embodiment carry the same reference numerals.

Figure 7:
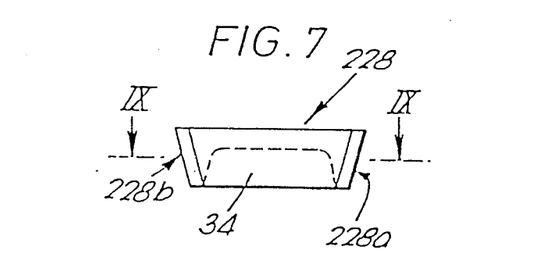
FIG. 7 is an elevation of an alternative form of cam follower for differentials in accordance with the invention.
Figures 10, 12, 13:
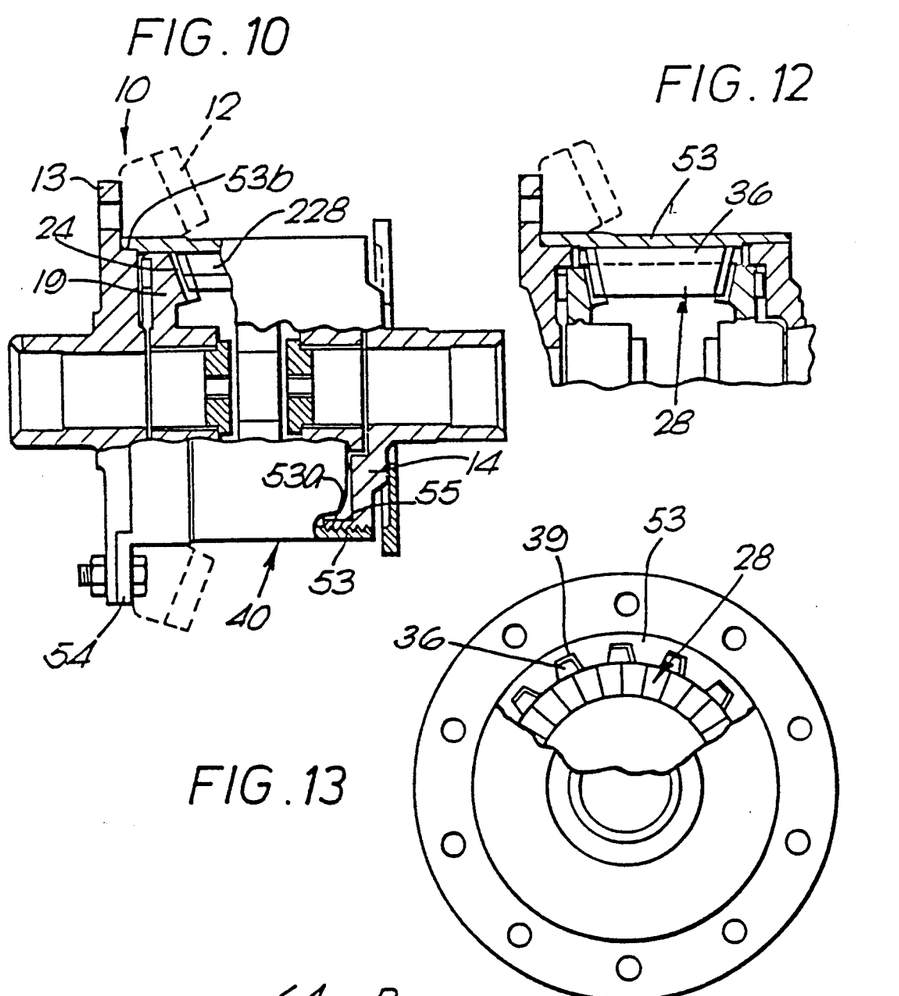
FIG. 10 is part cross-section showing another differential mechanism in accordance with the invention having a different form of construction using the follower of FIGS. 7 to 9.
FIG. 12 is an upper half cross-section of the differential constructed as shown in FIG. 10 but having the follower members shown in FIGS. 4 to 6.
FIG. 13 is an end view of part of the differential shown in FIG. 12.

In FIG. 10 the bolts 15 present in the embodiments of FIGS. 1 and 7 are omitted. The drive input element 40 includes a sleeve 53 by means of which the input members 13, 14 are held together axially. The sleeve 53 has flanges 54 at one end bolted to the input member 13, the opposite end of the sleeve being formed with a screw thread 53a screwed to a cylindrical extension 55 on the input member 13. The left hand end of the sleeve 53 is formed with a counterbore 53b which spigotally locates on the input member 13 for accurate concentricity.

Figure 8:
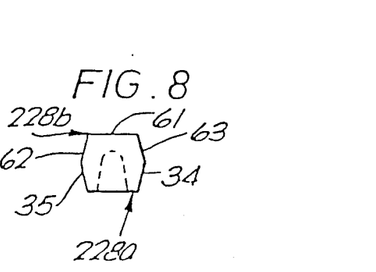
FIG. 8 is an end view of the cam follower in FIG. 7.
Figure 9:
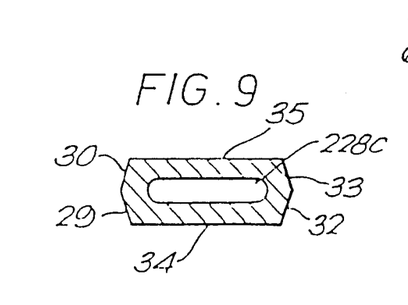
FIG. 9 is a cross-section of the cam follower of FIG. 10 on the line IX—IX in FIG. 7.

Cam followers 228 as shown in detail in FIGS. 7 to 9 are used in FIG. 10. The cam follower 228 has the same basic shape in plan as the cam follower 28 and has mutually inclined end surfaces 29, 30, 32 and 33 for engagement with the cam surfaces. However, as viewed in FIGS. 8 and 11, the radially inner half 228a of each follower has side surfaces 34, 35 inclined as in FIG. 5 and a driving dog 61 (forming a radially outer half 228b) has two inclined upper side surfaces 62, 63 which locate in grooves 64 in the sleeve 53. Each follower may be formed with a cavity 228c which reduces the mass of the follower.

Figure 11:
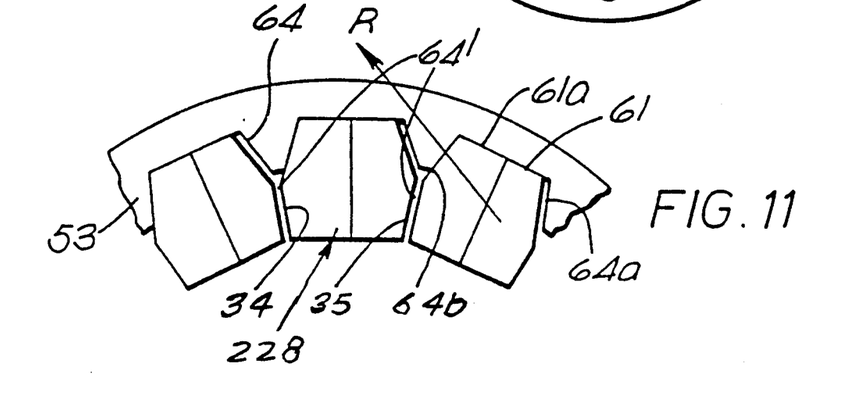
FIG. 11 is an end view of part of the differential shown in FIG. 10 drawn to a larger scale.

As shown in FIG. 11, a slight clearance 64a between the side of driving dog 61 and the groove 64 to ensure that the radially outer surface 61a of the driving dog engages the bottom of the groove leaving the follower free to slide axially. The arcuate embrace of each follower may be substantially 360/nf degrees where nf is the number of cam followers.

Nevertheless, in practice, it is anticipated that a small clearance 64' will exist between adjacent cam followers.

The resultant force R created during operation of the differential using the cam follower 228 preferably passes radially outboard of one of the radially inner corners 64b of each groove 64 as indicated in FIG. 11 to prevent tipping of the follower. The cam follower 228 enables radially deeper end faces 29, 30, 32, 33 to be used.

Therefore, as shown in FIG. 10, the cam surfaces (surface 24 being shown) can also be deeper than those in FIG. 1 which helps the driving load from the cam followers to be spread over an even larger cam area. This is a useful feature as it reduces wear between the mating cam and followers surfaces.

Figure 4:
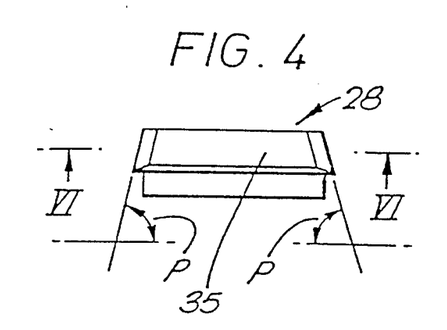
FIG. 4 is an elevation of a cam follower of the differential in FIGS. 1 to 3.
Figure 5:
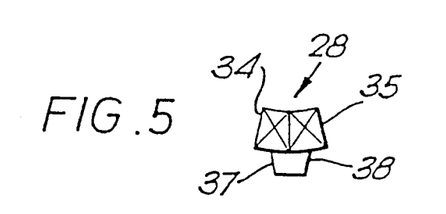
FIG. 5 is an end view of the cam follower in FIG. 4.
Figure 6:
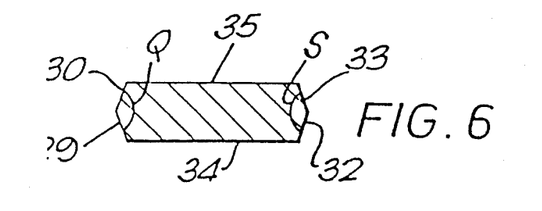
FIG. 6 is a cross-section of the cam follower on line VI—VI in FIG. 4.

Alternatively, the inner periphery of the sleeve 53 can be formed with grooves 39 as in FIGS. 12 and 13 identical to the grooves 39 in FIG. 2 to receive the driving dogs 36 of the cam followers 28 shown in FIGS. 4 to 6. The operation of the differential is the same as described with respect to FIGS. 1 to 9.

Figure 15:
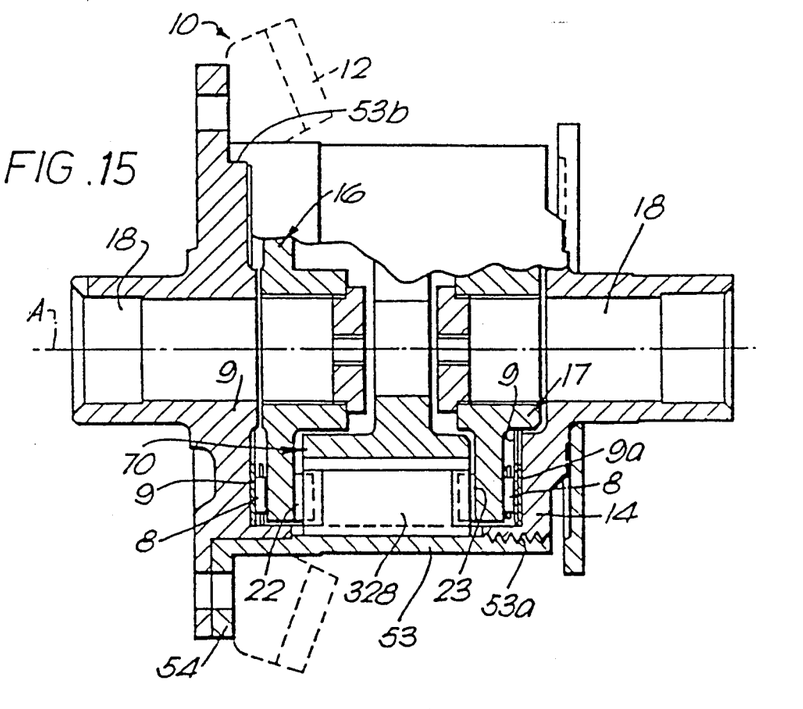
FIG. 15 is a cross-section through a further form of differential in accordance with the invention.
Figure 16:
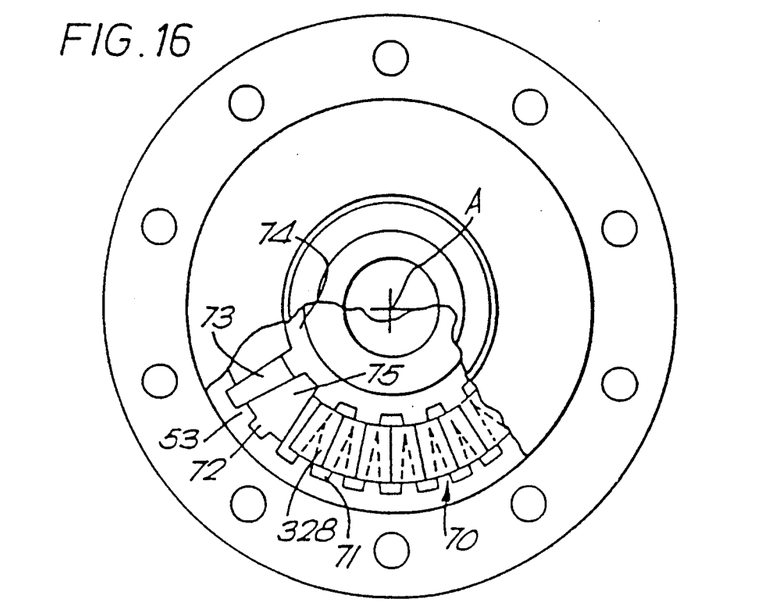
FIG. 16 is an end view of the differential of FIG. 15 shown partly in cross-section.
Figure 17:
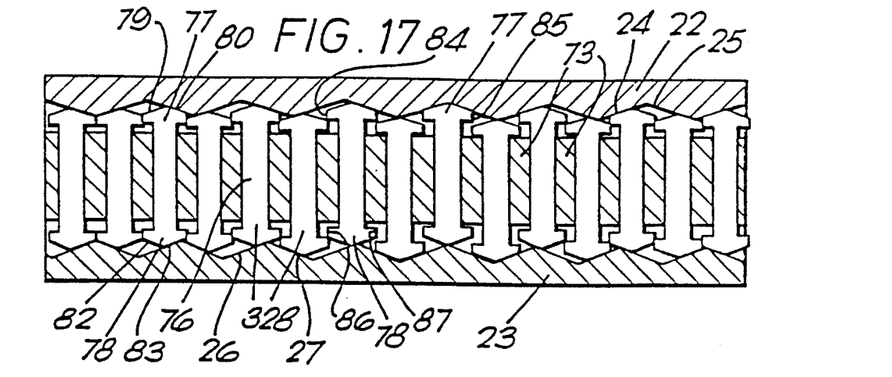
FIG. 17 is a development of cam surfaces of the differential in FIG. 16 with cam followers shown in positions therebetween.

In FIGS. 15 to 17 parts corresponding to parts in FIG. 13 carry the same reference numerals and only the differences will be described.

The sleeve 53 forms the outer section of a drive input element 70 which is formed with axial grooves 72. Alternate grooves 72 receive radially outer ends of legs 73 of a spider constituting an inner section 74 of the drive element. The inner and outer sections 74, 53 of the drive element define therebetween openings 75 in which fifteen cam followers 328 are slidably received, the cam followers which normally occupy the two openings marked 75 being omitted to enable the shape of the openings to be readily seen.

Each cam follower 328 comprises an elongate strut-like body 76 having two heads 77, 78. The head 77 has end surfaces 79, 80 which are mutually inclined for engagement with similarly inclined surfaces 24, 25 of a cam 22 and the head 78 has mutually inclined end surfaces 82, 83 engageable with similarly inclined surfaces 26, 27 of a cam 23. The head 77 has side surfaces 84, 85 and the head 78 has side surfaces 86, 87. The side surfaces of adjacent heads lie closely adjacent each other and, during use, a cam follower in non drive-transmitting engagement with the cam surfaces may transmit driving load to the adjacent cam follower in drive transmitting engagement with the cam surfaces. Radially outer sections 71 of the cam followers 328 locate slidably in grooves 72 not occupied by the legs 73. Although the cams 22, 23 are not shown inclined to axis A so as to converge towards each other, they may be formed so as to converge in that way.

Figure 18:
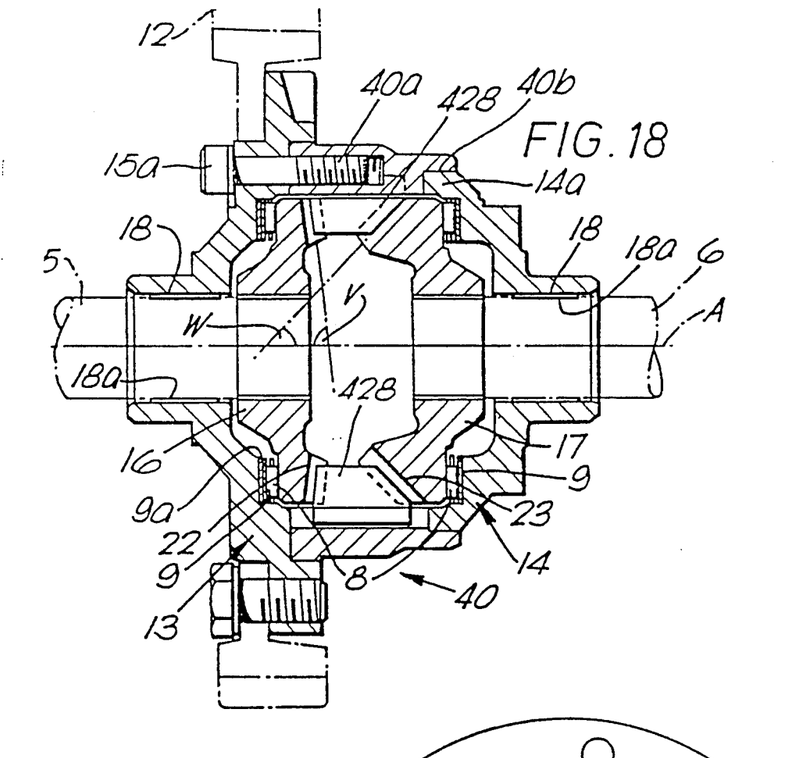
FIG. 18 is a cross-section through another form of differential in accordance with the invention.
Figure 19:
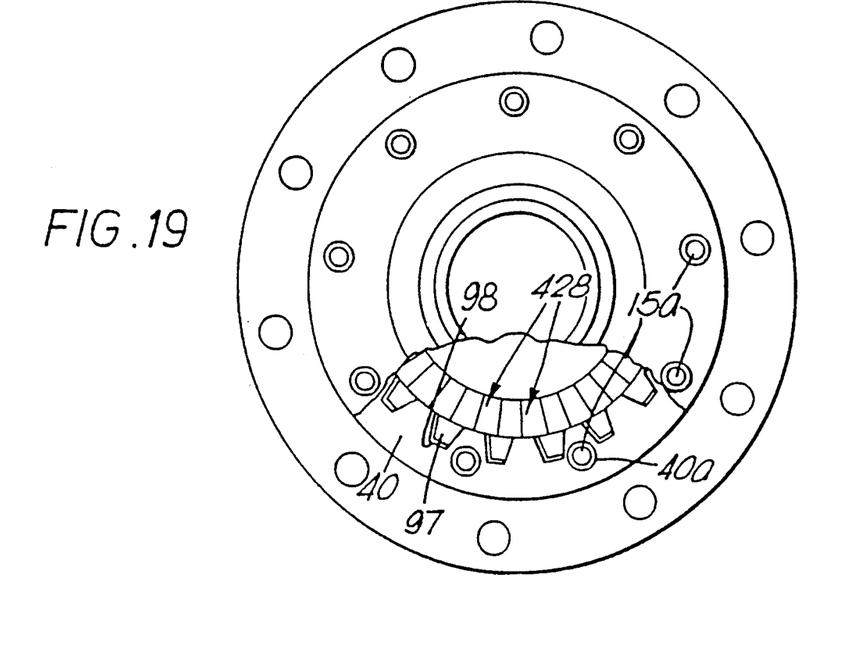
FIG. 19 is an end view of the differential of FIG. 18 shown partly in cross-section.
Figure 20:
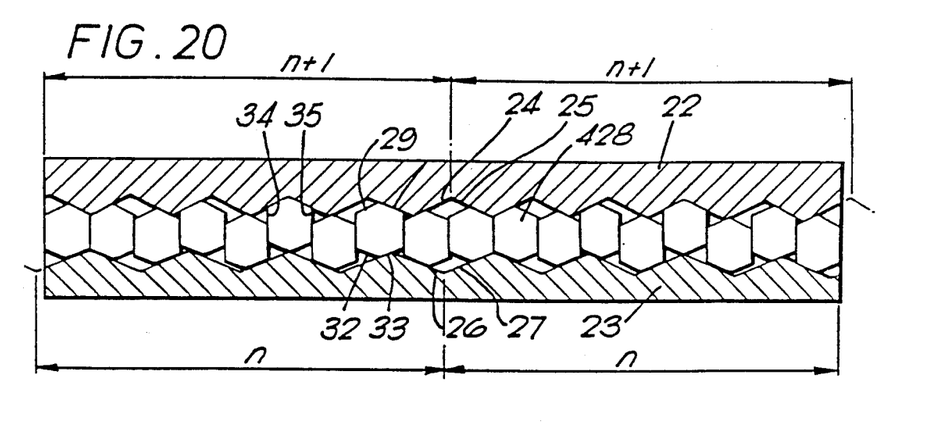
FIG. 20 is a development of cam surfaces of the differential in FIG. 19 with cam followers shown in positions therebetween and FIG. 21 shows each cam member having surfaces mutually inclined at different angles.

In FIGS. 18 and 20 parts corresponding to parts in the earlier drawings carry the same reference numerals.

In FIG. 18, the crown bevel gear 12 is bolted to input members 13 and input member 13 is secured to a cylindrical drive input element 40 by circumferentially spaced bolts 15a. The bolts locate in screw threaded axial bores 40a extending from the left-hand end of the input element 40 as viewed in FIG. 18. The right-hand end of the input element 40 is formed with a counter-bore 40b which receives and is welded to a cylindrical section 14a of input member 14.

In FIG. 18 it can be seen that the angles of inclination to the axis A of the undulating surfaces of cams 22, 23 are different, the undulating surface of cam 22 being inclined at angle V and the undulating surface 2 of cam 23 being inclined at angle W. The cam followers 428 have similarly inclined helical end surfaces 29, 30 and 32, 33. The end surfaces 29, 30 are also mutually inclined at the same angle as helical surfaces 24, 25 of cam 22 and end surfaces 32, 33 are inclined at the same angle as helical surfaces 26, 27 of cam 23. Each cam follower has side surfaces 34, 35. The side surfaces of adjacent cam followers face each other for the full axial travel thereof and are preferably arranged as shown in FIG. 14 although they could engage each other over the full axial travel. In that way the cam followers (which are driven through projections 97 location in grooves 98 in the drive input element 40 in the same manner as described with respect to FIGS. 1 to 6 and 11) give each other maximum support and, as described above, a cam follower in non-driving engagement with the cam surfaces can transmit driving load to the adjacent cam follower. Cam 22 includes ten mutually inclined surfaces 24, 25 and cam 23 includes eight mutually inclined surfaces 26, 27. The arcuate embrace of each follower is substantially 360/nf degrees or less where nf is the number of cam followers.

As the angle of inclination between surfaces 24, 25 is different from that between surfaces 26, 27 the division of torque between the output shafts (indicated at 5, 6 in FIG. 18) splined to the cams 22, 23 will be different when the cams are turning relative to each other in one direction than when they are turning relatively in the opposite direction.

It has been found that appropriate selection of angles V and W will enable the ratio of torques transmitted to the shafts to be selected either to provide a substantially equal ratio for both directions of relative rotation or a different ratio for each direction as required. Once a given relationship has been achieved between the torque ratio in one direction and the torque ratio in the other direction using a given set of angles V, W and angles of inclination between the cam surfaces, a variation in the coefficient of friction between the cam surfaces and the cam followers arising from selection of alternative materials will not significantly alter the relationship. For example, if a torque ratio of 4:1 in each direction is achieved with selected materials, the selection of alternative materials may give a torque ratio of 3:1 in both directions, the relationship between the torque ratios therefore remaining constant.

As in FIG. 1, and for the same purpose shims 9, a Belleville Washer 9a, and needle bearings 8 are provided. In this case the Belleville washer is adjacent the input member 13.

In FIG. 20, the cam 23 is formed with two identically patterned tracks providing a total number n of pairs of inclined surfaces 26, 27, each track extending for exactly half of the length of the cam surface. The tracks of each cam are shown notionally continued in broken lines. Cam 22 is formed with two identically patterned tracks each providing a total number (n+1) of pairs of inclined surfaces 24, 25. In the example shown each track of cam 23 provides four pairs of surfaces 26, 27 and each track of cam 22 provides five pairs of surfaces 24, 25. Eighteen cam followers 428 are provided in such a case. With differentials using axially displaceable cam followers, differential rotation between the cams can result in a non-symmetrical axial loading on the cams in the direction of axis A which will, in turn, place extra loading on bearings 18a in the bores 18 for shafts 5, 6. However by arranging the cam surfaces and cam followers in a repeating pattern as in FIG. 20 the axial loading will be applied symmetrically to the cams (in the present case at diametrically opposite positions at all times). It will be understood that three or more repeating patterns could be used in a similar way to give symmetrical axial loading.

The different angles of inclination W, V and the repeating patter of cam surfaces and the followers can also be applied to the differentials illustrated in FIGS. 1 to 17.

Figure 21:
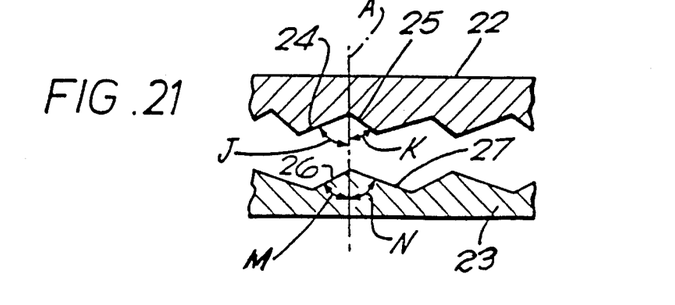

In FIG. 21 the two cams 22 and 23 are illustrated in part with their mutually inclined surfaces 24, 25 and 26, 27 inclined at different angles to the direction of axis A.

On cam 22, the surface 24 is inclined at angle J whilst surface 25 is inclined at smaller angle K.

On cam 22, the surface 26 is inclined at angle M whilst surface 27 is inclined at greater angle N.

The end surfaces of the cam followers (not shown) will be complementary to the cam surfaces which they engage as before and the cams of FIG. 21 may be used in any of the differential mechanisms described with reference to FIGS. 1 to 20.

By using the FIG. 21 arrangement, a different torque ratio will be achieved when the vehicle fitted with the differential is being driven through the differential in one direction than when the vehicle is in an overrun condition where the transmission is tending to drive the engine. In the first condition the wheels are driven via, say, the faces 24, 28 and in the overrun condition via faces 25, 27.

By providing cams as shown in FIG. 22 different torque division characteristics between the cams can be obtained when driving in a forward direction than when driving in a reverse direction.

We claim:

1. A differential mechanism comprising, two output cam members rotatable about an axis, each said member having a single annular cam surface thereon of undulating form comprising pairs of mutually inclined surfaces, the cam surface on each cam member comprising at least two identical tracks which form the complete annular cam surface, one of said cam members having a different number of said pairs of inclined surfaces thereon than the other of said cam members, the cam surfaces on the two cam members converging towards the axis, a plurality of substantially identical cam followers which have end surfaces thereon for engaging the cam surfaces of the output cam members, the arrangement being such that relative contra rotation of said output cam members causes the cam followers to slide axially, and an input element extending circumferentially around the cam followers and engaging with the radially outer portion of the cam followers to move the follower circumferentially relative to the output cam members, the cam followers being elongate in the direction of said axis and slidably supported at least towards ends thereof by the surrounding drive input element, the cam followers lying side by side with the adjacent side surfaces of each cam follower in contact with or lying closely to the side surfaces of each adjacent cam follower and during drive of said output cam members through the followers a force is created which urges the follower members radially outward towards said drive input element.

2. A differential mechanism according to claim 1 in which each track section of one cam surface has n pairs of inclined cam surfaces and each track of the other cam surface has a greater number of pairs of inclined cam surfaces.

3. A differential mechanism as claimed in claim 1 in which the difference between the number of pairs of inclined surfaces on the two cam members is a said number, and each cam member comprises said number of identical track sections arranged in series to form the completed annular cam surface whereby axial loading applied thereto by the cam followers during drive is applied substantially symmetrically to the cam member.

4. A differential mechanism according to claim 2 wherein the outer surface has $n+1$ inclined pairs of cam surfaces thereon within each track section.

5. A differential mechanism according to claim 1 in which during said relative rotation of the cam members substantial portions of said side surfaces of the adjacent cam followers overlap each other continuously during full axial sliding movement thereof.

6. A differential mechanism according to claim 1 in which said adjacent surfaces interengage in use and drive from the input element is transmitted from a cam follower in non-driving engagement with the cam surface to a cam follower in driving engagement with the cam surfaces.

7. A differential mechanism according to claim 1 in which resilient means is provided for urging the cam surfaces and the end surfaces of the cam followers against each other.

8. A differential mechanism according to claim 1 in which the resilient means acts between a portion of the input element and one of said cam members so as to urge said one cam member towards the other.

9. A differential mechanism according to claim 8 in which the resilient means applies load to the cam member through a thrust bearing.

10. A differential mechanism according to claim 1 in which a resilient support means is provided for biasing the cam followers towards the drive input element.

11. A differential mechanism according to claim 10 in which the support means is a spring arranged coaxially with the cam members.

12. A differential mechanism according to claim 1 in which said drive input element comprises first and second sections which are drivably interconnected so as to define openings in which the cam followers are slidably located.

13. A differential mechanism according to claim 12 in which the first section includes a plurality of radial projections with the cam followers disposed therebetween.

14. A differential mechanism according to claim 13 in which said second section comprises a sleeve coaxial with the first section, the radial projections drivably engaging the sleeve.

15. A differential mechanism according to claim 14 characterised in that the radial projections locate in grooves in the sleeve.

16. A differential mechanism comprising a drive input element two output cam members rotatable about an axis, said cam members having annular cam surfaces of undulating form coaxial with said cam members and a plurality of cam followers having cam engaging end surfaces for imparting drive to the cam members, the cam surfaces of the cam members converging towards the axis, the cam engaging surfaces of the cam followers being complementary to the cam surfaces, each cam surface having a number of mutually inclined faces and angles of convergence of the cam surfaces being different whereby torque delivered to the cam members will be divided between the cam members at a desired ratio or ratios for both directions of relative rotation between the cam members.

17. A differential mechanism according to claim 1 in which said drive input element and cam follower members interengage through projection and recess means.

18. A differential mechanism according to claim 17 in which the projection and recess means are tapered in the radial direction.

19. A differential mechanism according to claim 1 in which the undulating annular cam surfaces comprise a multiplicity of helical zig-zag faces, the zig-zag faces comprise a plurality of mutual inclined pairs of faces one face of each pair being inclined differentially from the other face of each pair.

20. A differential mechanism according to claim 1 in which the cam engaging surfaces of the cam followers comprise two inclined helical surfaces at each end for engagement with the respective cam surfaces.

21. A differential mechanism according to claim 1 in which each cam follower includes a radially inner first portion and a radially outer second portion to which driving load is imparted, said end surfaces extending over both said first and second portions.

22. A differential mechanism according to claim 21 in which the radially outer second portion is tapered and slidably locates within a tapered axial groove in the input element.

23. A differential mechanism according to claim 22 in which the radially inner first portion is tapered so that first portions of the adjacent followers interengage or lie close adjacent.

24. A differential mechanism according to claim 1 in which drive from an input is transmitted to said drive input element for imparting drive to the cam followers by removable bolts.

25. A differential mechanism according to claim 1 in which said drive input element comprises a member formed with screw threading by which it is screwed to at least one of two spaced apart input sections.

* * * * *